Dec. 12, 1944. G. NEMNICH 2,364,746
MOTION PICTURE MECHANISM
Filed Oct. 2, 1942 2 Sheets-Sheet 2
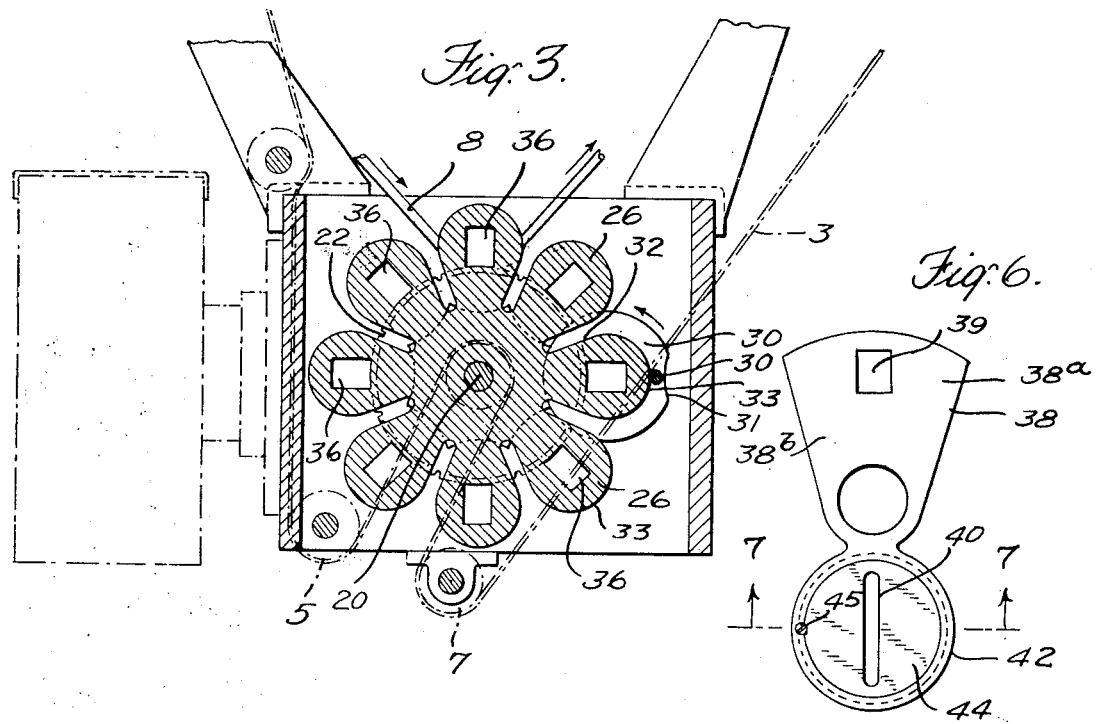
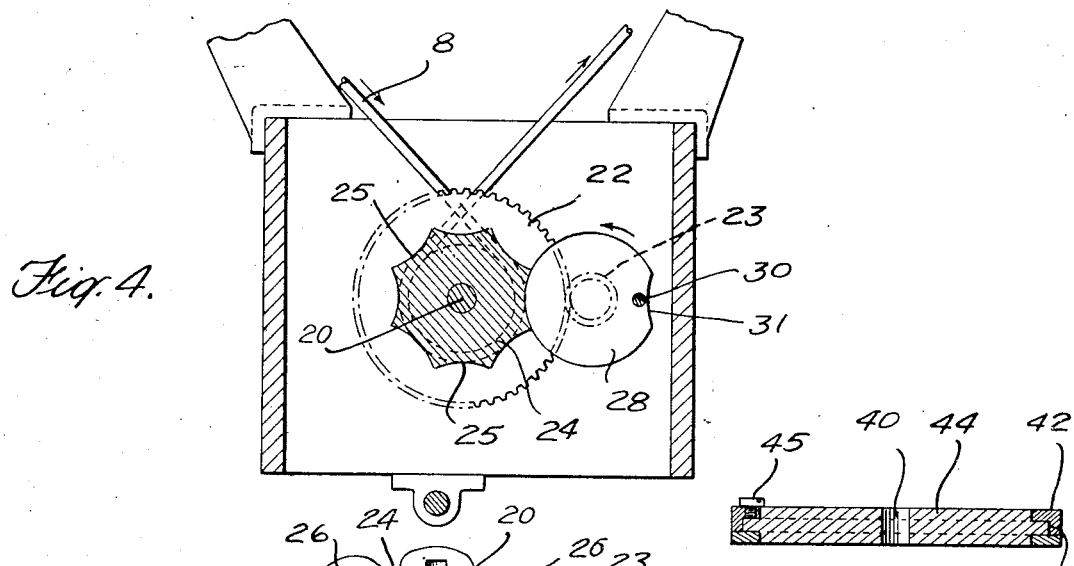
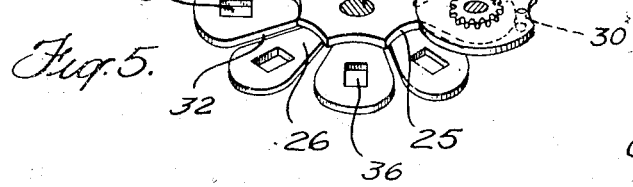
INVENTOR
GUSTAV NEMNICH
BY
Geo. M. Dove
ATTORNEY Patented Dec. 12, 1944

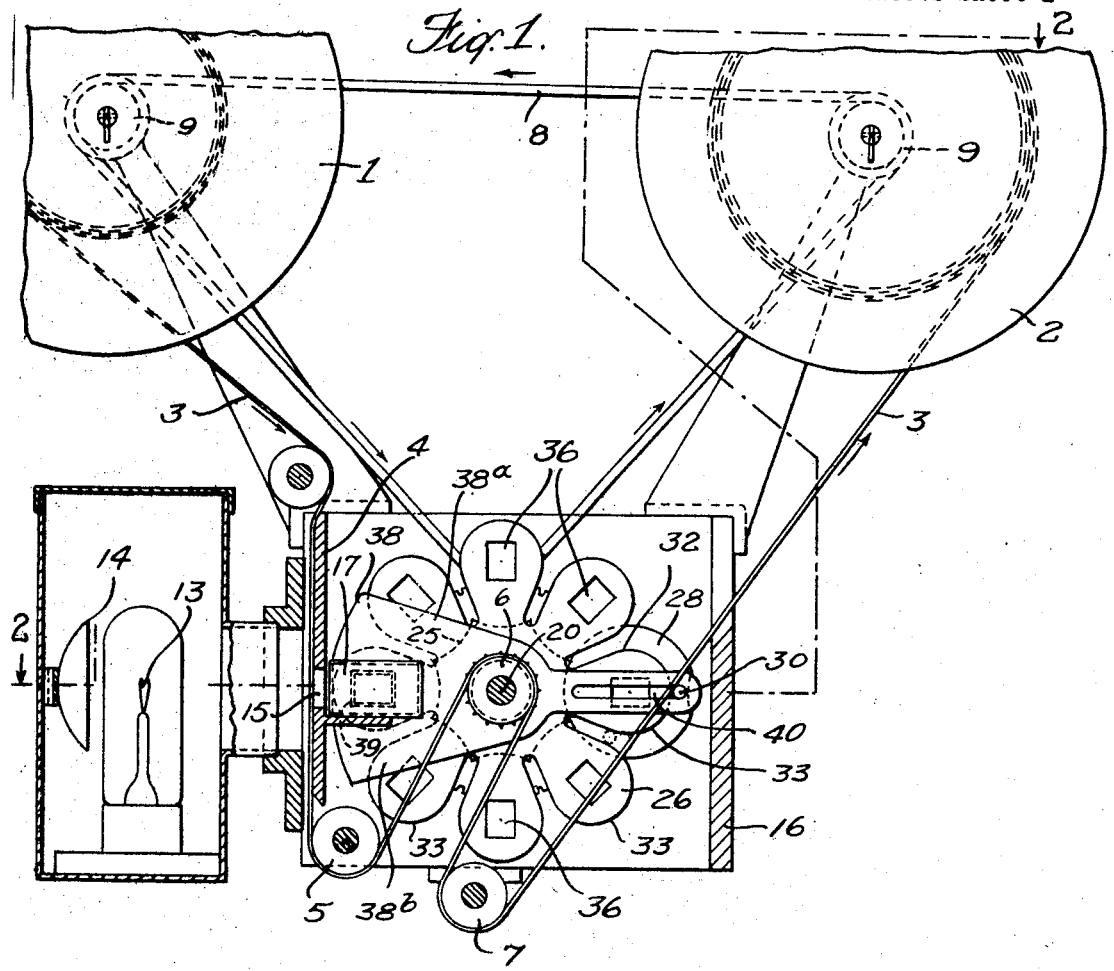

2,364,746

UNITED STATES PATENT OFFICE 2,364,746

MOTION-PICTURE MECHANISM

Gustav Nemnich, New York, N. Y., assignor to Kin-O-Lux, Inc., New York, N. Y., a corporation of New York Application October 2, 1942, Serial No. 460,526

18 Claims. (Cl. 88—18.3)

This invention relates to intermittent drive mechanism and more particularly to motion picture mechanism adapted for shutter operation and for intermittently moving the film whether such mechanism is employed for use in a camera, a projector or a viewer.

One of the objects of the invention is to reduce the number of parts usually found necessary in mechanism for this purpose.

Another object is greatly to reduce the noise.

A further object is to provide a shutter mechanism which is adjustable as to the time of light transmission and light obscuration.

In the attainment of the above objects a feature of the invention relates to the provision of a scalloped member having a plurality of convex scallops whereby the film is intermittently advanced.

Another feature relates to the provision of a scalloped member having radial portions and circular portions and a rotatable disc carrying a pin which advances the scalloped member and the film during a portion of its rotation and is in constant engagement with the scalloped member during its entire rotation, thus contributing to the elimination of noise.

Another feature relates to the provision of a film moving member having apertures associated therewith together with means for moving the member intermittently, and intermittently moving a shutter to cover or expose said apertures.

A number of other features and advantages will appear from the following description and claims when taken in connection with the accompanying drawings in which Fig. 1 is a sectional view of so much of the apparatus as is necessary to an understanding of the invention.

Fig. 2 is a section on the irregular line 2—2, Fig. 1.

Fig. 3 is a section on the line 3—3, Fig. 2.

Fig. 4 is a section on the line 4—4, Fig. 2.

Fig. 5 is a perspective view of the convex scalloped member, the Geneva locking member and the disc having a pin by which the film is fed by engagement of said pin with the scalloped member.

Fig. 6 is a detail of the shutter showing means for adjusting the same; and

Fig. 7 is a section on the line 7—7, Fig. 6.

Referring to the drawings and particularly to Fig. 1, the mechanism illustrated includes the usual supply reel 1 and a take-up reel 2. The film 3 passes from the supply reel in front of an apertured plate 4 after passing around an idler 3a, and about an idler 5 and around a sprocket 6. Then about another idler 7, from which it passes to the take-up reel 2. A flexible belt 8 passes about pulleys 9 on the reels and about a pulley 10 (Fig. 2). The pulley for the take-up reel is connected to said reel through any well-known friction drive indicated diagrammatically at 12 (Fig. 2).

When the mechanism is to be used as a projector a source of light 13 is in the focus of a mirror 14 (Fig. 1), and light may pass through the film and through the aperture 15 in the plate 4.

Inside of the casing 16 is located a prism 17 which totally reflects the light which then takes the direction of the arrow shown in Fig. 2 whereby the picture is projected on a screen.

It is obvious that when the mechanism is to be used in a camera, then the barrel 18 may include a lens system and the image formed by the lens system will be focused on the film 3. When used for a camera of course the source of light 13 and reflector 14 are omitted.

For driving the mechanism a shaft 20 is provided which may be driven by a motor but in the present embodiment of the invention a handle 19 is shown. The pulley 10 is secured to the shaft 20 to thereby supply power to the reels through the belt 8. Also secured to the shaft is a large gear wheel 22 in constant mesh with a smaller gear 23 (Figs. 2 and 3), the smaller gear being supported by a stud shaft 21.

A sleeve 27, supported by the shaft 20, carries a Geneva locking member 24 having concave scallops 25 therein (Fig. 4). Also carried by the sleeve 27 is a member 26 having convex scallops as shown in Figs. 1, 3 and 5, the convex scallops of which are equal in number to the concave scallops of the Geneva locking member 24. In the present embodiment eight convex and eight concave scallops are shown although it is obvious that different numbers may be employed although in each case the number of one kind of scallops would be equal in number to the other kind.

A driving disc 28 for intermittently moving the film through means of the scalloped member 26 is secured to the small gear 23 and this disc carries a pin 30. The disc 28 and the Geneva locking member 24 are in the same plane as shown in the perspective view (Fig. 5), and also in the sectional view (Fig. 2). The convex scalloped member 26 however is in a different plane but the pin 30 projects into the plane of the scalloped member 26 and slightly beyond in order to engage a shutter, the construction and operation of which will be hereinafter described.

When the shaft 20 is rotated, either by the handle 21 or by motor operated means, the large gear 22 is directly driven and through its engagement with the small gear 23 rotates the disc 28. The disc is provided with a cut-out portion 31 adjacent the pin 30 which serves to unlock the Geneva as is customary in Geneva locking movements.

In the present instance however, this pin serves to move the film through the medium of the convex scalloped member 26 instead of through the Geneva. The scallops of said member have radial portions 32 and circular portions 33.

As the shaft 20 is rotated clockwise it moves the disc 28 anti-clockwise or in the direction of the arrow shown in Figs. 1, 3 and 4. While the pin 30 is passing along the circular portion 33 of any scallop, no movement of the member 26 takes place but when the pin reaches about the position shown by the end of the leadline from 32 (Figs. 1 and 3), the scalloped member 26 is moved clockwise. The parts are so proportioned that the movement from the position at the end of the leadline 32, to the dotted line position (Fig. 1), is sufficient to move the film from one picture position to the next. It is understood of course that the sprocket 6, the Geneva locking member 24 and the scalloped member 26 all move together being connected to the sleeve 27 (Fig. 2).

It is to be particularly noted that the pin 30 is in constant engagement with one or another of the scallops of the member 26 and therefore there is no striking of the pin against a part to be moved as is the case in apparatus of this sort employing the usual Maltese type of Geneva. Hence the noise of operation is greatly reduced.

Associated with each scallop of the member 26 is an aperture 36 which serves to permit the light from the light source 13 to pass to the screen when the apparatus is used as a projector. The apertures likewise serve to permit light from an object to be photographed to pass to the film. In the present embodiment the apertures 36 are shown as formed in the scallops of the member 26 but it is obvious of course that these apertures may be in a separate member secured to the member 26 and therefore they have been referred to in the claims as being associated with the member 26.

In order to obscure the light passing through the opening 15 during the time that the member 26 together with the film is being moved from one position to another, when the apparatus is used as a projector and to prevent light entering the member 18 (Fig. 2), from passing to the film when the apparatus is used in a camera it is necessary to provide means to close certain apertures 36 at the proper time. For this purpose a shutter 38 is provided, said shutter having wings 38a and 38b and an opening 39 there-between. The shutter also has a slotted tailpiece. The shutter is loosely mounted on the sleeve 27 and is therefore moved independently of the member 26. This movement is controlled by the pin 30 which extends into a slot 40 in the tail of the shutter as shown in Fig. 2.

A little before the pin 30 reaches that point in its travel where it is about to move the member 26, the shutter has been moved by the pin 30 to close two adjacent apertures 36. That is to say, it closes the aperture 36 which is opposite the aperture 15 in the plate 4 and also closes the next succeeding aperture 36, the wing 38a of the shutter closing one aperture and the wing 38b closing the other aperture. Thereafter and during the time that the pin 30 is moving the member 26 it is also moving the shutter so that both the member 26 and the shutter 38 move together until the pin reaches about the position shown in dotted lines in Fig. 1, at which point the shutter begins to move relatively to the member 26 to open the apertures 36 with which the shutter is at that time associated and when it reaches the position shown in full lines in Fig. 1, the aperture 36 which is opposite the aperture 15 is fully opened.

It may sometimes be desirable to vary the time of opening and closing of the apertures 36 by the shutter 38 and for this purpose the construction shown in Figs. 6 and 7 may be employed. For this purpose, the shutter has a circular ring 42 (Figs. 6 and 7). This ring is grooved as at 43 and a disc 44 fits into this groove. The disc is provided with the slot 40. A screw 45 serves to clamp the disc 44 and the ring 42 in their varied positions of adjustment. Thus by moving the disc, the time between the opening and closing of the shutter may be varied.

Other variations may be resorted to within the scope of the invention without departing from the spirit thereof.

What I claim is:

1. In a device for intermittently advancing a moving picture film, the combination with a supporting means for a film including a sprocket for advancing the film; of a Geneva locking member having concave scallops, a convex scalloped member, both said members rigid with said sprocket, the scallops of said last-mentioned member being equal in number to the concave scallops of said Geneva locking member and means for intermittently moving the convex scalloped member.

2. In a device for intermittently advancing a moving picture film, the combination with a supporting means for a film including a sprocket for advancing the film; of a Geneva locking member having concave scallops, a convex scalloped member, both said members rigid with said sprocket and a driving member in continuous engagement with said convex scalloped member for moving the same.

3. In a device for intermittently advancing a moving picture film, the combination with a supporting means for a film including a sprocket for advancing the film; of a Geneva locking member having concave scallops, a convex scalloped member having radial portions and circular portions and a rotatable driving member having a pin to engage a radial portion of said scalloped member to advance it and to make continuous contact with the circular portion of said scalloped member during further rotation of said driving member.

4. In a device for intermittently advancing a moving picture film, the combination with a supporting means for a film including a sprocket for advancing the film; of a scalloped member rigid with said sprocket, said member having radial portions and circular portions, each circular portion being a continuation of two adjacent radial portions, a rotatable driving member having a pin to engage a radial portion of said scalloped member on each rotation of said rotatable member intermittently to advance the film.

5. In a device for intermittently advancing a moving picture film, the combination with a supporting means for a film including a sprocket for advancing the film; of a convex scalloped member rigid with said sprocket, apertures associated with said member, a shutter for controlling the passage of light through said apertures, means for intermittently moving said member by its convex scallops and said shutter, said moving means moving said shutter relatively to said scalloped member to open and close said apertures.

6. In a device for intermittently advancing a moving picture film, the combination with a supporting means for a film including a sprocket for advancing the film; of a convex scalloped member rigid with said sprocket, apertures associated with said member, a shutter for controlling the passage of light through said apertures, a rotatable driving disc having a pin connected thereto and connections from said pin to move said scalloped member and shutter during a portion of rotation thereof said pin acting during another portion of its rotation to move said shutter to open and close said apertures.

7. In a device for intermittently advancing a moving picture film, the combination with a supporting means for a film including a sprocket for advancing the film; of a shaft by which the sprocket is rotatably supported, a scalloped member also supported by said shaft, said member having radial portions and circular portions, each circular portion being a continuation of two adjacent radial portions, a rotatable driving disc having a pin connected thereto, said pin engaging a radial portion of said scalloped member on each rotation of said disc intermittently to advance the film, a shutter pivoted on said shaft and connected to be moved by said pin in relation to said scalloped member.

8. In a device for intermittently advancing a moving picture film, the combination with a supporting means for a film including a sprocket for advancing the film; of a member having in an endless path a plurality of apertures for the passage of light and operatively connected with said sprocket to move in consonance therewith, a shutter for covering and exposing said apertures, a rotatable disc having a pin connected thereto and connections from said pin intermittently to move said sprocket and said shutter.

9. In a device for intermittently advancing a moving picture film, the combination with a supporting means for a film including a sprocket for advancing the film; of a shaft on which the sprocket is rotatably supported, a Geneva locking member having concave scallops and a convex scalloped member both rigid with each other but rotatably supported by said shaft, the scallops of said last-mentioned member being equal in number to the concave scallops of said Geneva locking member and means for intermittently moving the convex scalloped member to advance the film.

10. In a device for intermittently advancing a moving picture film, the combination with a supporting means for a film including a sprocket for advancing the film; of a shaft on which the sprocket is rotatably supported, a Geneva locking member having concave scallops, a convex scalloped member both of the latter also rotatably supported by said shaft and a driving disc having a pin in continuous engagement with said convex scalloped member for intermittently moving the same.

11. In a device for intermittently advancing a moving picture film, the combination with a supporting means for a film including a sprocket for advancing the film; of a shaft on which the sprocket is rotatably supported, a scalloped member also rotatably supported on said shaft, said member having radial portions and circular portions each circular portion being a continuation of two adjacent radial portions, a rotatable driving member and connections between said shaft and said rotatable driving member, said driving member having a pin to engage a radial portion of said scalloped member on each rotation of said rotatable member intermittently to advance the film.

12. In a device for intermittently advancing a moving picture film, the combination with a supporting means for a film including a sprocket for advancing the film; of a shaft by which the sprocket is rotatably supported, a second member also rotatably supported by said shaft, apertures associated with said second member, a shutter for controlling the passage of light through said apertures, means for intermittently moving said second member and said shutter, said moving means moving said shutter relatively to said second member to open and close said apertures.

13. In a device for intermittently advancing a moving picture film, the combination with a supporting means for a film including a sprocket for advancing the film; of a member having a plurality of apertures for the passage of light, a shutter for covering and exposing said apertures said shutter having a slot therein, a rotatable disc having a pin connected thereto and in engagement with the slot in said shutter and connections from said pin intermittently to move said film and said shutter.

14. In a device for intermittently advancing a moving picture film, the combination with a supporting means for a film including a sprocket for advancing the film; of a member having a plurality of apertures for the passage of light, a shutter for covering and exposing said apertures said shutter having a slot therein, a rotatable disc having a pin connected thereto and in engagement with the slot in said shutter, connections from said pin intermittently to move said film and said shutter, and means for varying the relation between said shutter slot and said pin.

15. An intermittent drive device adapted for use in apparatus of the class described, comprising a rotatably mounted member with convex scallops having radial portions and circular outer portions, and a rotatable driving member having a pin in continuous contact with such scalloped member to drive the same one step due to contact with the trailing edge of the radial part of one scallop and after passing around the circular part of the next scallop in contact therewith, another step by contact with the trailing edge of the radial part of said next scallop.

16. An intermittent drive device adapted for use in apparatus of the class described, comprising a rotatably mounted member with convex scallops having radial portions and circular outer portions, a rotatable driving member having a pin in continuous contact with such scalloped member to drive the same one step by contact with the trailing edge of the radial part of one scallop and after passing around the circular part of the next scallop in contact therewith, another step by contact with the trailing edge of said next scallop, and means for locking the convex scalloped member in position between such step movements.

17. An intermittent drive device adapted for use in apparatus of the class described, comprising a Geneva locking member having concave scallops, a rotary member having convex scallops with radial portions and circular outer portions, said members rigid with each other, and a rotary driving member comprising a recessed disk cooperating with said locking member and a pin in continuous engagement with such convex scalloped member for rotating the same step by step.

18. An intermittent drive device adapted for use in apparatus of the class described, comprising a rotatably mounted driven member with convex scallops projecting from its central portion and separated at their inner portions by radial slots between their side edges, the outer ends of said scallops having circular arc edges to which the side edges are tangent; and means for driving said driven member step by step including a driving member rotatable about an axis parallel to that of the driven member, the axis of the driving member and the axes of the outer ends of the scallops being equidistant from the axis of the driven member whereby the axes of said ends may be brought into alignment with the axis of said driving member, and a pin projecting from said driving member at a distance from the axis thereof substantially the same as the radii of the circular arc edges of the outer ends of the scallops whereby the pin will follow the circular arc edge of the outer end of a scallop and upon engaging the leading side of the following slot will advance the driven member from the time it enters the slot until it leaves it.

GUSTAV NEMNICH.